June 11, 1963 L. P. HUNTER 3,093,816

SUPERCONDUCTOR PERSISTENT CURRENT CIRCUITS

Filed May 26, 1960 4 Sheets-Sheet 1

INVENTOR
LLOYD P. HUNTER

BY John E. Dougherty Jr.
ATTORNEY

United States Patent Office 3,093,816

Patented June 11, 1963

3,093,816
SUPERCONDUCTOR PERSISTENT CURRENT CIRCUITS

Lloyd P. Hunter, Poughkeepsie, N.Y., assignor to International Business Machines Corporation, New York, N.Y., a corporation of New York Filed May 26, 1960, Ser. No. 31,940
24 Claims. (Cl. 340—173.1)

The present invention relates to superconductor circuits and, more particularly, to persistent current superconductive circuits which include a plurality of superconductive paths connected in parallel circuit relationship to form a plurality of superconductive loops in which persistent currents are selectively stored.

It is, of course, now well established that closed loops of superconductive material maintained at a temperature at which they are superconductive are capable of having stored therein currents which persist indefinitely without the application of electrical energy. Briefly, such devices depend for their operation upon the characteristic of the superconductive state in accordance with which it is not possible to change the net flux threading a loop of superconductive material without introducing resistance into the loop. Therefore, when a loop of superconductive material is allowed to become superconductive, at a time when there is net flux threading the loop, a persistent current is established in the loop to maintain this net flux constant. Once established in such a loop, this persistent current remains in the loop as long as the entire loop remains superconductive. Examples of persistent current devices are found in copending applications Serial No. 615,814, filed on October 15, 1956, in behalf of R. L. Garwin, and Serial No. 861,392, filed on December 22, 1959, in behalf of D. R. Young, and both assigned to the assignee of the subject application. The primary use of the superconductive persistent current storage device has been in the field of information storage and many structures as well as modes of operation have been proposed for the storing of binary information in superconductive loops. This is accomplished either by selectively storing current in two opposite directions to represent binary one and binary zero, or by allowing the presence of persistent current in the loop to represent a binary one and the absence of a persistent current to represent a binary zero. Superconductive loops have also been used to store information in notations other than binary which require more than two stable states, as is evidenced by copending application Serial No. 781,749, filed December 19, 1958, in behalf of J. L. Anderson, and assigned to the assignee of the subject application. The superconductor persistent current storage devices of the prior art, as is evidenced by the structures shown and described in the above mentioned copending applications, each include a single loop formed of two parallel superconductive paths and, regardless of the persistent current in the device, the persistent current in these paths must be equal. As a result, it has not been possible, without the use of biased output devices, to provide a continuous indication of the state of the loop using two cryotrons, one of which is always resistive and the other of which is always superconductive. Further, when storage in notations other than binary has been accomplished, it has been necessary to provide inputs to the loops of an incremental type and the output circuits have been required to recognize small differences in the magnitude of the persistent currents stored in the loop.

In accordance with the principles of the present invention, superconductive persistent current storage devices are provided which are capable of storing information in any notation, which are capable of continuously providing a unique current output manifestation in one of a plurality of output paths, and in which the discrimination between the outputs is such as to render the tolerances not critical. One embodiment of this invention which is disclosed herein as being illustrative of these principles is in the form of a superconductor circuit including three parallel superconductive paths, each of which forms with each other path a superconductive loop so that the circuit includes three superconductive loops. Input means are provided for selectively storing persistent currents in two of the three loops at one time. Since one of the paths is common to both of the loops in which the persistent current is stored, the total persistent current in this path is necessarily greater than that in the other paths. The circuit is provided with output cryotrons, the gates of which are responsive to the current in the paths forming the loop and the circuit can be caused to assume any one of the three stable states. In each of these states the current in a particular one of the paths is appreciably greater than the current in each of the remaining paths so that the gates of the output cryotrons associated with the path carrying the larger current are resistive and those associated with the paths carrying the smaller current are in a superconductive state. This device including the three paths forming the three loops may be used as a binary or ternary storage device and, in either application, provides output discrimination at least of two to one and a continuous current output on one out of two or one out of three output lines as the case may be. Further embodiments of the invention are also disclosed in the form of circuits including four parallel superconductive paths. These paths form six superconductive loops in which persistent currents are selectively stored. This device is capable of operation as either a binary, ternary or quaternary storage device and provides output discrimination of at least three to one when operated in any of these modes. In accordance with a further embodiment of the invention, a persistent current storage device is operated in such a way that persistent currents are initially established in the device and, thereafter, information is stored by introducing resistance into one path of one of the loops in which a persistent current is stored to thereby change the persistent current in another path forming part of another loop. In this way, it is possible to change the current stored in a path of a persistent current loop without introducing resistance into that loop.

It is a principal object of the present invention to provide improved superconductive storage devices.

It is a further object to provide superconductive storage devices capable of storing information in any notation and providing output indications of the information stored in the form of a current signal on a unique one of a plurality of current paths.

It is still a further object to provide superconductive storage devices including a plurality of superconductive paths connected in parallel circuit relationship to form a plurality of superconductive loops in which persistent currents may be stored in such a way that the total persistent current in at least one of the superconductive paths in the loop is distinguishably different from the total persistent current in at least one other of the paths.

Still another object is to provide improved superconductor persistent current circuits including a plurality of superconductive loops wherein the persistent current stored in any one loop is dependent upon the persistent current stored in another one of the loops so that the persistent current stored in a path of one loop may be changed without introducing resistance into the loop.

The foregoing and other objects, features and advantages of the invention will be apparent from the following more particular description of preferred embodiments of the invention, as illustrated in the accompanying drawings.

In the drawings:

FIG. 1 is a diagrammatic representation of a persistent current storage device including three parallel superconductive paths forming three superconductive loops.

FIG. 1*a* is another representation of the circuit of FIG. 1.

Figures 1, 1A:
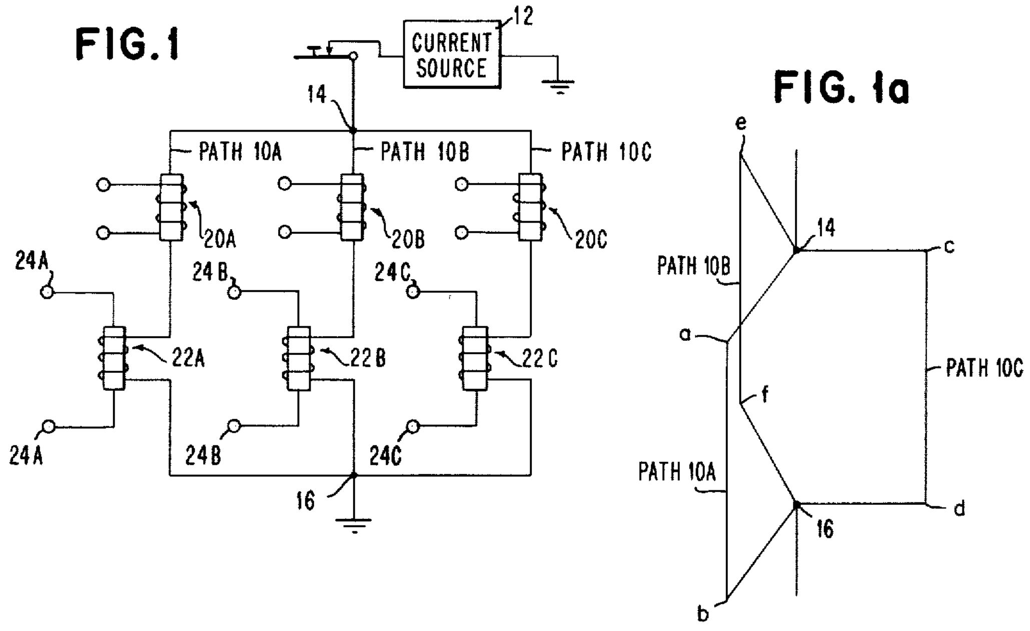

Referring now to the drawings in detail, FIG. 1 shows a superconductor circuit which includes three parallel superconductive paths designated 10A, 10B and 10C. These paths extend in parallel between a pair of terminals 14 and 16 which are connected to the terminals of a current source 12 which supplies current to the paths under control of a switching device which is schematically illustrated. 10C is constructed entirely of superconductive material and each pair of paths forms a closed superconductive loop. Thus, a first closed superconductive loop is formed by the paths 10A and 10B, a second closed superconductive loop is formed by the paths 10B and 10C, and a third loop is formed by the paths 10A and 10C. The three paths are so constructed that each exhibits the same inductance. This is accomplished either by fabricating the paths with conductors having the same cross sectional geometry and making the paths of equal length or of adjusting the cross sectional geometry of the conductors forming the paths relative to the lengths of the paths.

The three loops formed by the paths having equal inductance are illustrated in the schematic diagram of FIG. 1*a* in what is believed to be a more graphic representation. In this figure, each of the paths has the same length and the first loop formed by paths 10A and 10B may be traced from the terminal 14, through points *a* and *b*, terminal 16 and points *f* and *e* back to terminal 14. The second loop may be similarly traced from terminal 14, through points *c* and *d*, terminal 16 and points *f* and *e*, back to terminal 14. The third loop is traced from terminal 14 through points *a* and *b* to terminal 16, and thence through points *d* and *c*, back to terminal 14. This schematic representation of FIG. 1*a* demonstrates one way in which the three loops formed by the paths may be constructed so that the paths are essentially identical as are the three loops formed by the paths.

Referring again to FIG. 1, the three paths of the circuit are shown connected in parallel across the current source 12. When this current source is actuated to supply current at terminal 14, in the absence of resistance in any one of the paths, the applied current divides equally among the three paths of equal inductance. Thus, if we assume that current source 12 is actuated to apply a current of twelve units, this current divides at terminal 14 so that four units of current flow in each of the paths 10A, 10B and 10C. For illustrative purposes in describing this and other embodiments of the invention herein disclosed, current flowing downwards in the paths as shown in the figure, that is, from terminal 14 to 16, is considered positive current, and current in the other direction, that is, upwards from terminal 16 to terminal 14, is considered negative. If, with a positive current of four units being supplied to each of the superconductive paths 10A, 10B and 10C by the current source 12, the control conductor of a cryotron 20A, the gate conductor of which is connected in path 10A, is energized, the four units of current in this path are shifted out of this path into paths 10B and 10C. Since paths 10B and 10C have equal inductance, two units of current are shifted into each of these paths so that each then carries a total of plus six units of current and there is no current in path 10A. If, after this current shift has been accomplished, the control conductor for cryotron 20A is deenergized, this current distribution remains the same as long as each of the paths 10B and 10C is entirely superconductive and there is, therefore, no means provided for shifting the current out of these superconductive paths.

If, after this current distribution has been obtained and with paths 10A, 10B and 10C still superconductive, the current applied by source 12 is terminated, a persistent current condition is realized with net persistent currents flowing in two of the completely superconductive loops formed by these paths. The manner in which superconductive currents are established in persistent current loops operated in this manner is described at length in the above cited copending application Serial No. 861,392. Currents are stored when the current from the supply source 12 is terminated since it is a characteristic of the superconductive state that it is not possible to change the net flux threading a completely superconductive loop. The amount of current stored in the various loops may be determined easily by considering that, when the current from a source 12 is terminated, twelve units of current are withdrawn from the circuit and this current is withdrawn from the paths inversely in proportion to their inductances. Since each of the three paths has equal inductance, four units of current are withdrawn from each path, that is, there is a change of minus four units of current in each path. Thus, the current in each of the paths 10B and 10C is reduced from plus six units to plus two units and the current in path 10A is changed from zero to minus four units. The currents in these paths are actually currents flowing in the persistent current loops formed by these paths. There is a net persistent current of two units flowing in a clockwise direction in the loop formed by paths 10A and 10B and a similar net persistent current of two units in a clockwise direction flowing in the loop formed by paths 10A and 10C. There is no net persistent current flowing uniquely in the loop formed by paths 10B and 10C since, at the time the current from source 12 is terminated, each of these equal inductance paths forming this loop is carrying the same current.

As a result of the above described operation, it can be seen that there is a total of four units of current flowing in the control conductor of a cryotron 22A, which control conductor is connected in path 10A, and two units of current flowing in the control conductors of two further cryotrons 22B and 22C, which are connected respectively in paths 10B and 10C. The cryotrons 22A, 22B and 22C may be considered to be output cryotrons and the response of the gate conductors to current in the control conductors of these cryotrons is, in this illustrative embodiment, dependent only upon the magnitude of the current in the control conductors and not upon its direction. Thus, it can be seen that if each of these cryotrons is designed so that a current in excess of three units is required in the control conductor to drive the gate conductor resistive, as a result of the above described operation, the gate of cryotron 22A is resistive and the gates of cryotrons 22C and 22B are superconductive. The states of these cryotrons may be detected at the terminals 24A, 24B and 24C which are connected across the cryotron gates.

A similar operation may be performed to store net persistent currents in the two loops of which path 10B forms a part, or in the two loops of which path 10C forms a part. In the former case this is accomplished by first energizing any two or all three of the control conductors for the input cryotrons 20A, 20B and 20C to quench any persistent currents then in the loops. Current source 12 is then actuated to apply a current of twelve units and the control conductor of cryotron 20B is energized to cause this current to flow in paths 10A and 10C. The gate of cryotron 20B is then allowed to become superconductive and, finally, the current supplied by source 12 is terminated. As a result of this operation, a clockwise net persistent current is stored in the loop formed by paths 10B and 10C and a counterclockwise net persistent current in the loop formed by the paths 10A and 10B. There is then a current of minus four units flowing in path 10B and a current of plus two units flowing in each of the paths 10A and 10C. After such an operation, the gate of cryotron 22B is resistive and the gates of cryotrons 22A and 22C are superconductive. A third stable persistent current state is achieved by performing the same operation as described above with the exception that the control conductor of cryotron 20C is energized and deenergized so that persistent currents are established in the loops of which path 10C forms a part. The persistent currents stored in the loops by this operation are effective to drive the gate of cryotron 22C resistive and are ineffective to drive the gates of cryotrons 22A and 22B resistive.

Thus, it can be seen that by operating the circuit of FIG. 1 as described above, the circuit can be made to assume any one of three different persistent current states. In each state, net persistent currents are stored in two of the three loops formed by the three paths 10A, 10B and 10C and the net current in one of the paths is greater than the current in either of the other paths so that only one of the three output cryotrons is resistive. Further, there is twice as much persistent current in one of the paths as there is in the other two paths and, thus, the design of the output cryotrons 22A, 22B and 22C is not a serious problem from a tolerance standpoint.

The circuit of FIG. 1 may be also operated where the inputs are applied coincidently to two of the input cryotrons during each input operation. When this mode of operation is practiced, the application of inputs is effective to quench any persistent current stored in the circuit since resistance is then introduced into two of the three paths forming the circuit and, thus, into all of the three loops in the circuit. Assume, for example, that twelve units of current are applied to the three parallel paths 10A, 10B and 10C and that the control conductors of cryotrons 20A and 20B are energized to introduce resistance into paths 10A and 10B. The entire current from source 12 is then directed into the remaining path 10C. When the control conductors of cryotrons 20A and 20B are deenergized to then allow these paths to become entirely superconductive, the current remains in path 10C which is also superconductive. When the current from source 12 is terminated, using the rule enunciated above, four units of current may be considered to be withdrawn from each of the equal inductance paths so that there is a current of minus four units in each of the paths 10A and 10B and a current of plus eight units in path 10C. If we assume now that the output cryotrons 24A, 24B and 24C each require a current in excess of four units in its control conductor to drive the gate conductors resistive, then only the gate of cryotron 22C is resistive and the gates of the other two cryotrons are superconductive. Alternately, the circuit may be constructed as described above with the coils of the output cryotrons having a critical current greater than two units and the current source 12 operated to supply a current of only six units rather than twelve units, in which case there would be four units in a plus direction in path 10C and two units of current in a minus direction in each of the paths 10A or 10B.

The circuit may be operated to store the larger current in the path 10B by coincidently energizing the control conductors of cryotrons 20A and 20C during the input operation, in which case, the persistent current of plus eight units flows in path 10B and a current of minus four units flows in each of the paths 10A and 10C. The gate of cryotron 22B is then resistive and the gates of the other two cryotrons are superconductive. If, during an input operation the control coils of cryotrons 20C and 20B are energized, then the larger value of persistent current is established in path 10A and, upon termination of the operation, only the gate of cryotron 22A is resistive. It should be noted that for this mode of operation, as was the case for the operation where only one input cryotron is energized during each input operation, there is twice as much current in one path as there is in the other paths when the circuit is in any one of its stable states. A further feature to note is that the larger value of persistent current is established in the one of the paths which is treated differently during an input operation than the other two paths. Thus, for example, if an input is applied to only one of the three input cryotrons, then the larger persistent current is established in the path including the gate which is driven resistive by the applied input. However, if during an input operation, inputs are applied to two of the three input cryotrons, then the larger value of persistent current is established in the path which was allowed to remain entirely superconductive.

Figure 2:
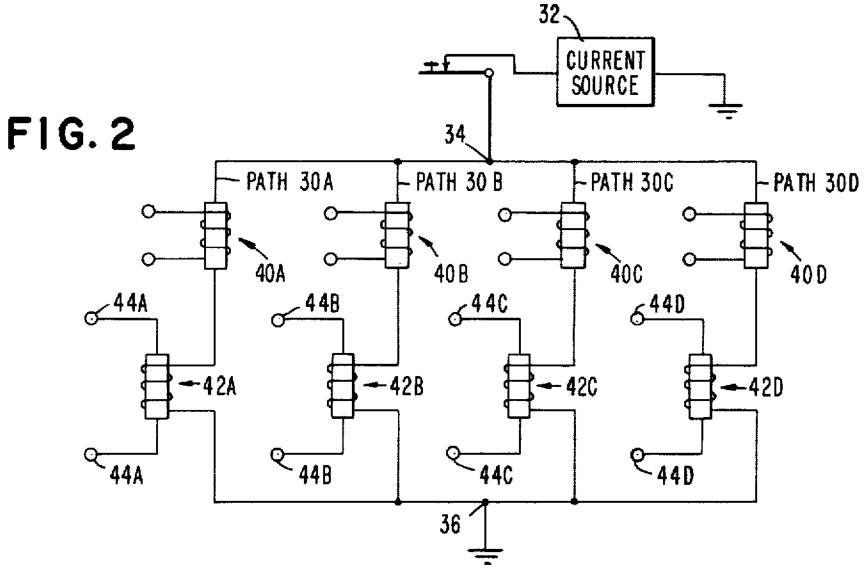
FIG. 2 is a schematic representation of a superconductor persistent current circuit including four parallel superconductive paths which form six superconductive loops.

The circuit of FIG. 2 is similar to that of FIG. 1, differing only in that it includes four parallel superconductive paths which are designated 30A, 30B, 30C and 30D. Each of these paths extends between a pair of terminals 34 and 36 which are connected to the terminals of a current source 32. Each path is constructed to have equal inductance and to include the gate conductor of one of four input cryotrons 40A, 40B, 40C and 40D, and a control conductor of one of four output cryotrons 42A, 42B, 42C and 42D. The four paths of the circuit of FIG. 2 form six loops. The first loop is formed by paths 30A and 30B; the second loop is formed by paths 30A and 30C; the third loop is formed by the paths 30A and 30D; the fourth loop is formed by paths 30B and 30C; the fifth loop is formed by paths 30B and 30D; and the sixth loop is formed by paths 30C and 30D. Persistent currents may be selectively established in these loops to represent information values in the following manner. Assume that the current source 32 supplies a current of twelve units. This current divides equally between the four paths when each is superconductive so that there are three units in a plus direction in each path. If resistance is then introduced into one of the paths by energizing the control conductor for the appropriate input cryotron, the current in that path is shifted into the other three paths so that each of the other three paths then carries four units of current in a positive direction. Thus, for example, if after current source 32 is actuated, the control conductor for cryotron 40A is energized, a current distribution is obtained with four units of current in a positive direction flowing in each of the paths 30B, 30C and 30D. If then, after the gate conductor of cryotron 40A is allowed to become superconductive, the current from source 32 is terminated, net persistent currents are established in each of three loops of which path 30A forms a part. Using the rule enunciated above, the magnitude of the current established in each of the paths is obtained by considering three units of current to be withdrawn from each path. Thus, upon termination of the current from source 32, a persistent current of three units in a negative direction flows in path 30A and a persistent current of one unit in a positive direction flows in each of the other paths 30A, 30B and 30C. These currents are formed by net persistent currents in a clockwise direction of one unit each flowing in each of the loops of which path 30A forms a part, that is, the loop formed by paths 30A and 30C, the loop formed by paths 30A and 30B, and the loop formed by paths 30A and 30D. Thus, the current in path 30A is three times the current in each of the other paths.

By proper design of the output cryotrons 42A, 42B, 42C and 42D so that they require more than one unit of current, but less than three units to drive them resistive, only the gate of output cryotron 40A is resistive after the above described operation which causes persistent currents to be established in each of the three loops of which path 30A forms a part. It should be noted that here the discrimination between the magnitude of the current in the one path 30A to that in each of the other three paths 30B, 30C and 30D is three to one, thereby rendering the tolerances of the output cryotrons even less stringent than in the embodiment of FIG. 1. Persistent currents in the three loops of which any one of the four paths 30A, 30B, 30C and 30D form a part, may be established in the manner described above, by first quenching all of the persistent current by introducing resistance into any three or all four of the paths, then actuating current source 42, energizing and deenergizing the control conductor for the appropriate input cryotron, and then terminating the supply current.

If, during an input operation, signals are applied simultaneously to two selected ones of the four input cryotrons, the magnitude of the persistent current is such that the magnitude of the current in each path is the same and the particular pair of input cryotrons energized determines only the direction of the persistent currents in the four paths. Thus, if during an input operation, the control conductors for cryotrons 40A and 40B are energized, a current distribution is obtained with six units of current in each of the paths 30C and 30D. Termination of the supply current, after the control conductors for cryotrons 40A and 40B are deenergized, results in the establishing of persistent currents such that there is a current of plus three units flowing in each of the paths 30C and 30D and a current of minus three units flowing in paths 30A and 30B. In this case, these currents in the four paths may be represented as persistent currents flowing in four of the six loops in the following manner. A clockwise current of one and one half units flows in the loop formed by paths 30B and 30C; a clockwise current of one and one half units flows in the loop formed by paths 30A and 30C; a clockwise current of one and one half units flows in the loop formed by the paths 30D and 30B; and a clockwise current of one and one half units flows in the loop formed by the paths 30D and 30A. Thus, it can be seen that when two of the input cryotrons are driven resistive during an input operation, the gates of the output cryotrons are either all superconductive or all resistive in accordance with the manner in which these cryotrons are designed. If each has a critical control conductor greater than three units, each is superconductive. If each has a critical control conductor less than three units, each is then resistive.

The circuit of FIG. 2 may also be operated by energizing three of the four input cryotrons during each input operation. If, for example, the control conductors for cryotrons 40A, 40B and 40C are energized during an input operation, the entire supply current is directed through path 30D. When the supply current is terminated, persistent currents are established in the three loops of which path 30D forms a part. These persistent currents cause a current of plus nine units to flow in path 30D and a current of minus three units to flow in each of the other paths 30A, 30B and 30C. By designing each of the output cryotrons to require a control current in excess of three units to drive the gate conductor resistive, only the output cryotron 42D is driven resistive after such an operation. It is important to note that where three input cryotrons are energized during each input operation, it is not necessary to quench the persistent current in the circuit prior to an input operation. By energizing different ones of the three input cryotrons, net persistent currents can be established selectively in any three of the six loops with the larger current flowing, for this mode of operation, in the path including the gate of the input cryotron which is not driven resistive during the input operation. Again, as was the case for the mode of operation described above, where one of the four input cryotrons was energized during an input operation, the ratio of the larger value of current in the one path to the smaller value of current in each of the other three paths is three to one, thereby providing good output discrimination.

Figure 3:
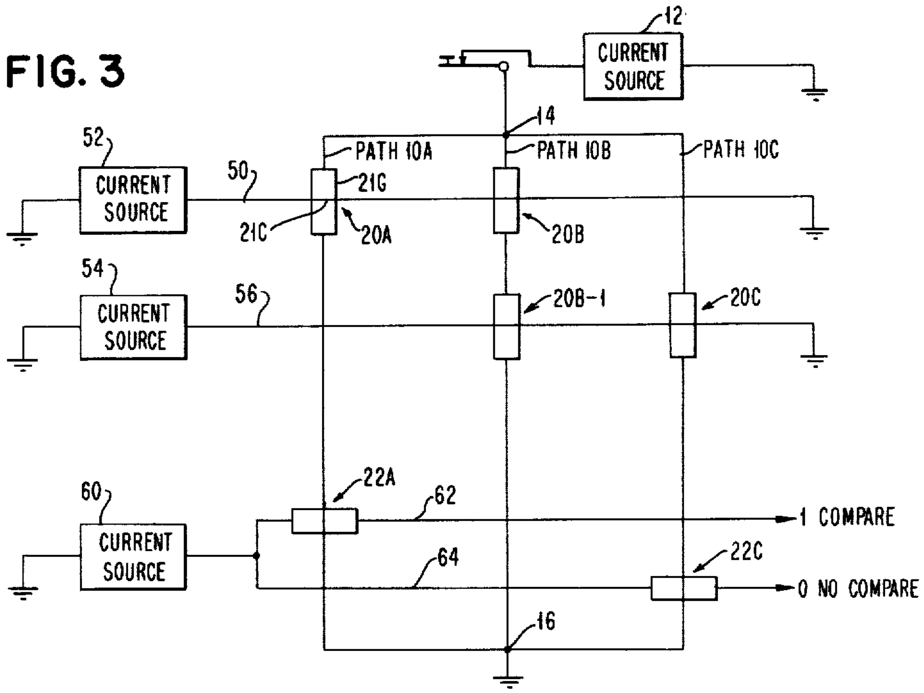
FIG. 3 is a schematic representation of a binary storage device constructed in accordance with the principles of the invention.

FIG. 3 is a schematic representation of a persistent current binary storage device constructed in accordance with the principles of the invention. Since this circuit is similar in most respects to the circuit shown in FIG. 1, the same or similar character designations are used to identify like components in both FIGS. 1 and 3. A different representation for a cryotron is utilized in FIG. 3 than in FIG. 1. The gate conductors are represented the same way in both figures but, in the showing in FIG. 3, only a single line crossing the gate is used to represent the control conductor. Thus, for example, considering the cryotron 20A in the upper left hand portion of FIG. 3, the gate is the rectangular block 21G and the control is the narrower conductor 21C which traverses this gate. Conductor 21C forms part of an address line 50 used to apply input information to the circuit of FIG. 3. The representation for the cryotron used in FIG. 3 is considered to render the circuit more easily understandable. Further, this type of representation more clearly depicts the actual manner in which thin film type cryotrons, which may be used in the fabrication of the circuit, are actually constructed. The principles of the invention are applicable both to circuits which use wire wound devices, such as are shown and described in U.S. Patent No. 2,832,897, issued to D. A. Buck, and to circuits in thin film form such as shown and described in copending applications, Serial No. 625,512, filed on behalf of R. L. Garwin on November 30, 1956, and Serial No. 765,760, filed on behalf of J. L. Anderson on October 7, 1959, both of which have been assigned to the assignee of the subject application.

In the circuit of FIG. 3, information is written under the control of a current source 52 which, when actuated, applies a signal to an address line 50, and a current source 54 which, when actuated, applies a signal to an address line 56. Line 50 includes the control conductors for cryotrons 20A and 20B. The gates of these cryotrons are connected in paths 10A and 10B, respectively, and are driven resistive when the current source 52 is actuated during an input operation to store a binary one in the device. The other address line 56 includes the control conductors for two input cryotrons 20B-1 and 20C. The gates of these cryotrons are connected in paths 10B and 10C, respectively. Current source 54 is energized when a binary zero is to be written in the storage device. As before, current source 12 applies a current of twelve units. During each input operation this source is actuated and then one or the other of the sources 52 or 54 is actuated to apply a pulse according to whether a binary one or binary zero is to be stored. After the completion of this binary input pulse, current source 12 terminates its current signal. When current source 52 is actuated during an input operation, the persistent currents established are such that there is a current of plus eight units in path 10C and a current of minus four units in each of the other paths 10A and 10B. When, during an input operation, current source 54 is actuated, the persistent currents established are such that there is a current of plus eight units in path 10A and a current of minus four units in paths 10B and 10C.

The outputs for the binary storage device of FIG. 3 are provided by current source 60 which is connected to an output circuit including two parallel paths 62 and 64. Path 62 includes the gate of output cryotron 22A and path 64 includes the gate of output cryotron 22C. Each of these cryotrons is designed so that when the current in its control conductor is equal to or greater than six units, the gate of the cryotron is resistive and when the current in the control conductor is less than six units, the gate of the cryotron is superconductive. Thus, when the bistable device is storing a binary one with eight units of current in path 10C and four units of current in each of the other paths, the gate of output cryotron 22C is resistive and the gate of output cryotron 22A is superconductive. The current from source 60, which may be continuously applied, is then entirely in path 62, assuming, of course, that paths 62 and 64 are connected either directly or through further superconductive circuits to a superconductive ground. When the bistable circuit is storing a binary zero with the eight units of persistent current flowing in path 10A, the state of the output cryotrons 22A and 22C is reversed and the output current is entirely in path 64. It should be noted that, in the device of FIG. 3, the information is represented by persistent currents stored selectively in two of the three loops formed by the paths of the circuit and that, though the circuit includes three parallel paths, only two are used in the output circuit, one of which, according to the binary information stored, is carrying sufficient current to drive the gate of the corresponding output cryotron resistive. Thus, the device of FIG. 3 is a bistable persistent current storage device which is capable of continuously providing a current output in one or the other of two output lines to indicate whether the device is storing a binary one or binary zero.

Another important feature of FIG. 3 is that the same output circuitry may be employed to compare the value stored in the device with binary information values represented by signals later applied to the circuit. For example, if the circuit is to be used for a comparison operation, the current source 12 is actuated to apply a current of minus twelve units when the input to the circuit for the comparison is to be a binary zero. When a comparison for a binary one is to be accomplished, current source 12 applies a current of plus twelve units. Considering the latter case first, and assuming that the device is storing a binary one with plus eight units of current in path 10C and minus four units of current in each of the paths 10A and 10B, the application of plus twelve units of current at terminal 14 causes the net current in paths 10A and 10B to be reduced to zero and the net current in path 10C to be increased to twelve units. In such a case, the gate of cryotron 22A remains superconductive and that of cryotron 22C remains resistive so that the current from source 60 is directed entirely to path 62 indicative of a comparison. When, however, with the device storing a binary one, current source 12 is actuated to apply a current of minus twelve units indicative of a binary zero, the current in path 10C is reduced from eight units to four units and the current in each of the paths 10A and 10B is increased from minus four units to minus eight units. Since the output cryotrons are not sensitive to the direction of the currents in their control conductors, the gate of cryotron 22A is then driven resistive and the gate of cryotron 22C becomes superconductive so that the current from path 60 is directed to path 64 indicating that the value stored in the device is not the same as the value represented by the input signal applied at terminal 14. The operation is similar when the device is storing a binary zero and there is a current of plus eight units in path 10A and a current of minus four units in each of the other paths. Under such conditions, when a binary one representing signal is applied in the form of a plus signal of a magnitude of twelve units, the net current in path 10A is increased to twelve units and the net current in paths 10B and 10C is decreased to zero. Cryotron 22A remains resistive and cryotron 22C remains superconductive and the current from source 60 is directed through path 64, indicating that the input is not the same as the value stored in the device. When, however, a binary zero representing signal of minus twelve units is applied, the current in path 10A is reduced from plus eight units to plus four units and the current in the other paths 10B and 10C is increased in magnitude from minus four units to minus eight units. The state of the cryotrons 22A and 22C is then changed and the current from source 60 is directed through the then superconductive gate of cryotron 22C, indicating a comparison. After any such comparison operation, the circuit assumes its original persistent current state, representative of either a binary one or binary zero, when the interrogation signal applied at terminal 14 is removed.

Figure 4:
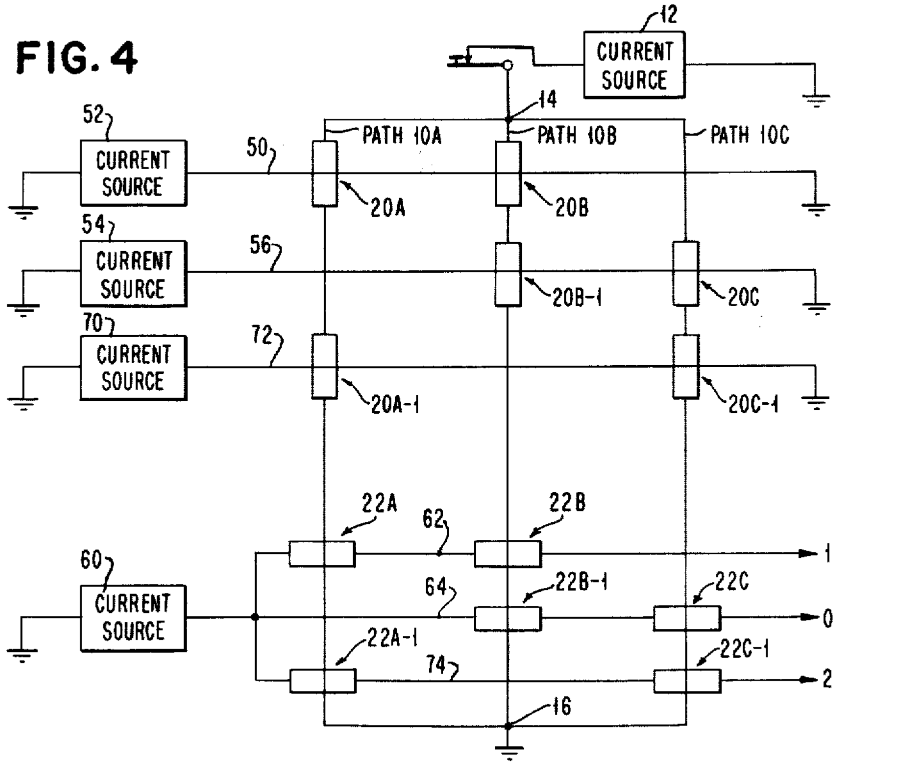
FIG. 4 is a schematic representation of a ternary storage device constructed in accordance with the principles of the invention.

FIG. 4 shows a circuit constructed in accordance with the principles of the invention together with the input and output circuitry necessary for its operation as a ternary storage device. The circuit of this figure is similar to that of FIGS. 1 and 3 and, for this reason, the same or similar character designations are used to identify like components. The circuit of FIG. 3 differs from the circuit of FIG. 4 in that, the latter circuit includes another input current source 70 and an address line 72 coupled to this source for controlling two further input cryotrons 20A–1 and 20C–1. Further, four more output cryotrons 22A–1, 22B, 22B–1 and 22C–1 have been added in the circuit of FIG. 4 and the output circuit includes three parallel paths rather than two, so that unique current indications representative of ternary values stored in the device are obtained.

The operation of the circuit of FIG. 4 is similar to that of FIG. 3 when current sources 52 and 54 are actuated during an input operation. When source 52 is actuated, a persistent current condition results with eight units of current in a positive direction in path 10C and a minus four units in each of the other paths. When current source 54 is actuated, the positive eight units of current flow in path 10A and minus four units in the other two paths. The address line 72 to which the current source 70 is connected includes the cryotrons 20A–1 and 20C–1. When this current source is actuated during an input operation, the current from current source 12 is directed through path 10B so that when the supply current is terminated, net persistent currents are established in each of the two loops which include path 10B. As a result, plus eight units of current flow in path 10B and minus four units of current flow in each of the other two paths. If we consider the three ternary values which may be stored in the device as a ternary zero, ternary one and ternary two, and that a ternary one is considered to be stored when the eight units of current flow in path 10C, a ternary zero to be stored when the eight units of current flow in path 10A, and a ternary two to be stored when the eight units of current flow in path 10B, then the current sources 52, 54 and 70 are respectively designated the ternary one, ternary zero and ternary two input sources.

The output circuit for the device of FIG. 4 includes six cryotrons, the gates for two of which are connected in each of three paths 62, 64 and 74 which are connected in parallel with current source 60. When the device is storing a ternary one, with eight units of current in path 10C, the gates of cryotrons 22C and 22C–1 are resistive and the output current is entirely in path 62. When the device is storing a ternary zero, the gates of cryotrons 22A and 22A–1 are resistive and the current from source 60 is directed through path 64. When the device is storing a ternary two, cryotrons 22B and 22B–1 are resistive and the entire current from source 60 is directed through path 64. The current source 60 may continuously apply current to the output circuit or intermittent pulses may be applied by this source. In any case, a unique current indication on one of the three output lines is provided which indicates the value stored in the storage device. As for other embodiments described and about to be described, the interrogation is nondestructive.

Figure 5:
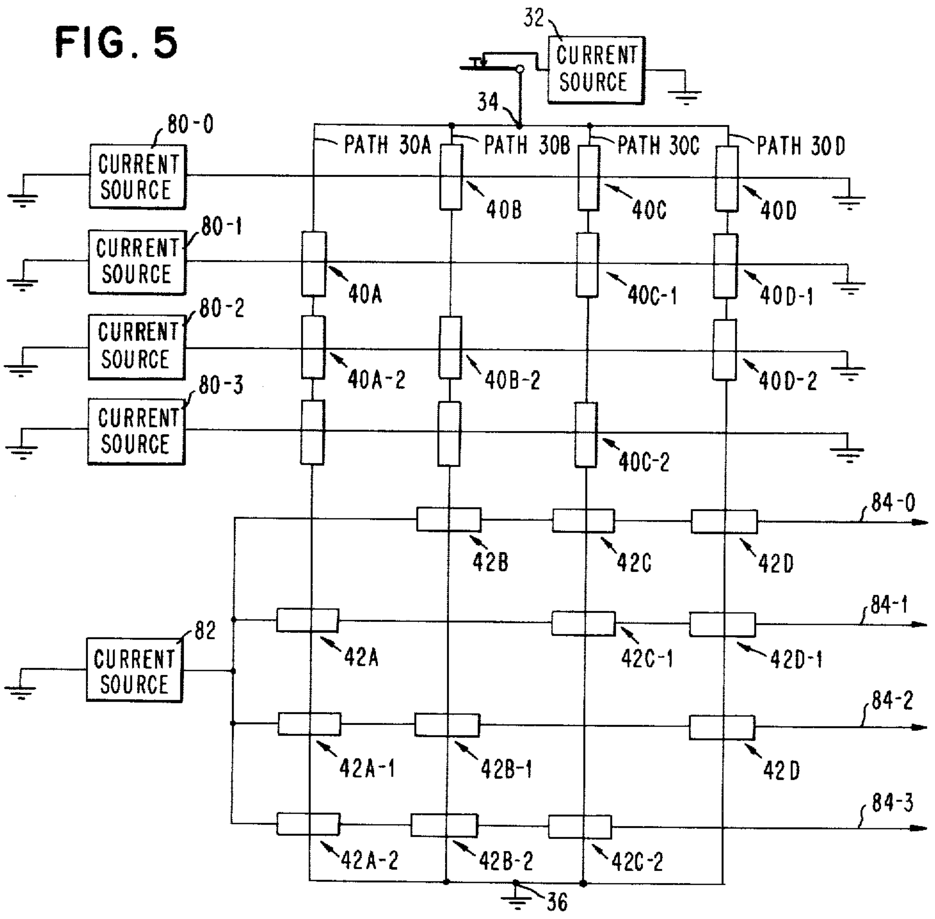
FIG. 5 is a schematic representation of a circuit constructed in accordance with the principles of the invention which is operable as either a binary, ternary or quaternary storage device.

FIG. 5 shows a device constructed in accordance with the principles of the invention which is capable of operation as a binary, ternary or quaternary storage device. The device can be interrogated non-destructively when operated to represent information in any one of these notations. The circuit is similar to that shown in FIG. 2 and, for this reason, the same or similar character designations are employed to identify like components. The circuit includes four paths 30A, 30B, 30C and 30D, connected in parallel across source 32. This current source is actuated during each input operation and, according to the value to be stored, one of four current inputs 80–0, 80–1, 80–2 and 80–3 is also actuated. When the device is operated as a quaternary storage device capable of storing values which are here designated zero, one, two and three, a zero is stored by operating source 80–0 during an input operation, and the values of one, two and three are stored by operating sources 80–1, 80–2 and 80–3 during an input operation. When source 80–0 is operated during an input operation, a persistent current distribution is obtained, as has been previously described with reference to FIG. 2, with nine units of current in a positive direction in path 30A and three units of current in each of the other paths. When a value of one is stored, nine units of current flow in path 30B; when a value of two is stored, nine units of current flow in path 30C; and when a value of three is stored, nine units of current flow in path 30D. The output circuit for the device of FIG. 5 includes a current source 82 across which four current paths 84–0, 84–1, 84–2 and 84–3 are connected in parallel. This output circuit includes twelve output cryotrons, the gate conductors for three of which are connected in each of the output current paths. When the device is storing a value of zero, with nine units of current in path 30A, resistance is introduced into the gates of cryotrons 42A, 42A–1 and 42A–2 and the output current is directed to path 84–0. Similarly, when the device is storing a value of one, cryotrons 42B, 42B–1 and 42B–2 are held resistive by the nine units of current in path 30B and the output current is directed through path 84–1. When the device is storing a value of two, the three output cryotrons 42C, 42C–1 and 42C–2 are resistive and the output current is in path 84–2 and, when the device is storing a value of three, the gate of cryotrons 42D, 42D–1 and 42D–2 are resistive and the output current is in path 84–3. It should be noted that when the device of FIG. 4 is operated, as described above, to store quaternary information, in each storage state, the current in one of the four paths is three times that in the other paths so that good discrimination is obtained for this high density storage.

The device of FIG. 5 may also be operated as a ternary storage device in which case inputs are applied, during an input operation, by one or the other of three input current sources 80–0, 80–1 and 80–2. Ternary zero, one and two values are then represented by nine units of current in paths 30A, 30B and 30C, respectively, and the current outputs are obtained, in accordance with the ternary values stored, on lines 84–0, 84–1 and 84–2. The device may also be operated as a binary device in which the inputs are applied by one or the other of the current sources 80–0 and 80–1 with a binary zero being represented by a current of nine units in path 30A and a binary one being represented by a current of nine untis in path 30B. The output for a binary zero is directed through path 84–0 and for a binary one, through path 84–1.

It should be noted that when the device of FIG. 5 is operated, as either a ternary or binary device, it has an advantage over the devices shown in FIGS. 1 and 3, in that the output discrimination is three to one, instead of two to one. If the device of FIG. 5 is to be operated only as a ternary storage device, then of course, the current source 80–3 and the associated cryotrons may be eliminated, as well as the output line 84–3 and cryotrons 42D, 42D–1 and 42D–2, which have their control conductors connected in path 30D. If the device is to be operated only as a binary storage device, then the current source 80–2 may also be eliminated, as well as the output path 84–2 and output cryotrons 42C, 42C–1 and 42C–2.

Figure 6:
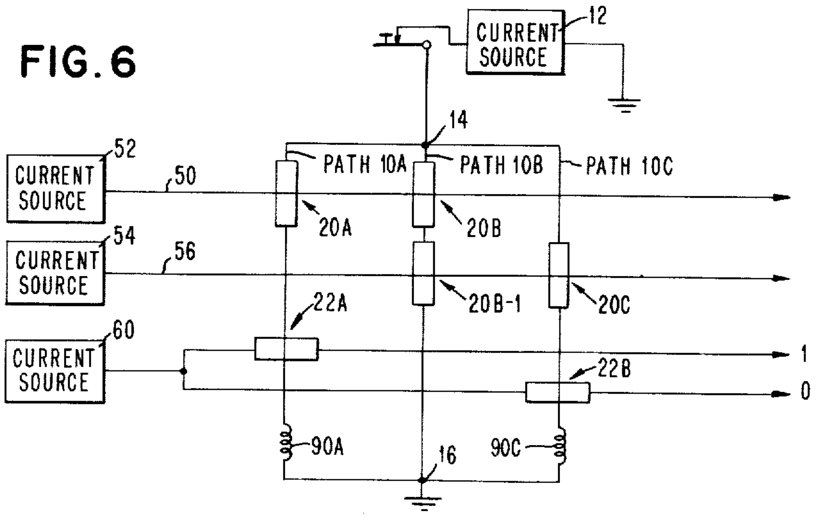
FIG. 6 shows a further embodiment of a binary storage device constructed in accordance with the principles of the invention.

The circuit of FIG. 6 is a schematic representation of another embodiment of a binary storage device constructed in accordance with the principles of the invention. This circuit is similar to that of FIG. 3 and, for this reason, like components in both figures are identified with the same character designations. The circuit of FIG. 6 differs from that of FIG. 3 in that the three parallel paths of the latter circuit are not constructed to have equal inductances but, rather, the inductance of path 10B is less than that of paths 10A and 10C, which have equal inductances. In order to schematically indicate this in the figure, lumped inductances in the form of coils 90A and 90C are shown to be connected in paths 10A and 10C. The design of the circuit of FIG. 6 is such that the inductance of each of the paths 10A and 10C is twice that of path 10B. By this type of design, the same output discrimination is obtained with this circuit as with the four path structure of FIGS. 2 and 5. Thus, for example, assuming that the current source 12 applies a current of twelve units to the paths 10A, 10B and 10C, in the absence of resistance in any one of these paths, six units of the applied current flow in the low inductance path 10B, and three units of current flow in paths 10A and 10C. When a binary one input is to be applied, current source 52 is actuated to supply a current pulse to line 50 and, therefore, drive the gates of cryotrons 20A and 20B resistive. As a result, the entire supply current of twelve units is directed through path 10C. After the pulse on line 50 is terminated, the supply current from source 12 is also terminated and net persistent currents are established in the two loops of which path 10C forms a part. Using the rule enunciated above, that is, that current is withdrawn from the parallel paths inversely in proportion to the inductance of these paths, when the supply current of twelve units is terminated, six units of current are withdrawn from path 10B and three units from each of the paths 10A and 10C. As a result, a positive current of nine units flows in path 10C, a negative current of three units flows in path 10A, and a negative current of six units flows in path 10B. Since the current in path 10B has no effect on the output circuit which includes only cryotrons 22A and 22B, an output discrimination of three to one is realized. The operation of the circuit to store a binary zero is similar with current source 54 being actuated to energize line 56 and drive the gates of cryotrons 20B–1 and 20C resistive. When this input pulse is terminated and, thereafter, the supply current, persistent currents are set up such that there is a current of plus nine units in path 10A, a current of minus six units in path 10B and a current of minus three units in path 10C.

When the circuit of FIG. 6 is storing a binary one, as described above, with nine units of current in path 10C, minus six units of current in path 10B and minus three units of current in path 10A, this current distribution is formed by a net persistent current of six units flowing in a conterclockwise direction in the loop formed by paths 10C and 10B and a net persistent current of three units flowing in a clockwise direction in the loop formed by paths 10C and 10A. When the device is storing a binary zero there is a net persistent current of six units in a counterclockwise direction in the loop formed by paths 10A and 10B and a net persistent current of three units in a counterclockwise direction in the loop formed by paths 10A and 10C.

Figure 7:
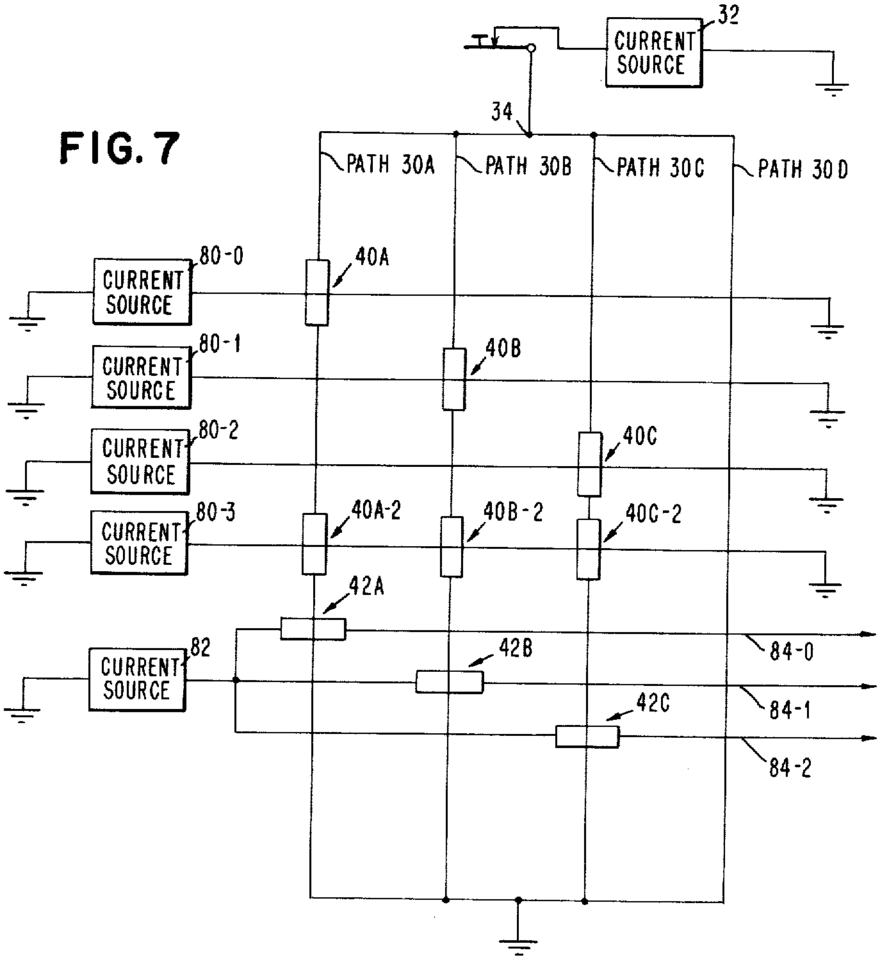
FIG. 7 is a further embodiment of a ternary storage device constructed in accordance with the principles of the subject invention.

The principles of the invention may be also applied to persistent current circuits in which persistent currents are initially stored in one or more loops formed by the parallel paths of the circuit and, thereafter, inputs are applied to the circuit to alter the persistent current condition therein. An embodiment of the circuit operated in this mode is shown in FIG. 7 and, since this circuit is similar in many respects to the embodiments of FIGS. 2 and 5, the same or similar character designations are used to identify like components in each of these figures. The circuit of FIG. 7 is conditioned for operation by actuating current source 32 to apply a current signal to the four parallel paths 30A, 30B, 30C and 30D. While this signal is being applied, current source 80–3 is energized to drive the gates of cryotrons 40A–2, 40B–2 and 40C–2 resistive so that the twelve units of current applied by source 32 flow entirely in path 30D. Thereafter, current source 80–3 terminates its pulse to allow all of the paths to become entirely superconductive and then current source 32 terminates the supply current. In accordance with the principles above explained, this operation results in setting up persistent current in each of the loops of which path 30D forms a part and these persistent currents are such that there is a current of plus nine units of current in path 30D and a current of minus three units in each of the paths 30A, 30B and 30C. Once the circuit has been conditioned in this manner, inputs are applied selectively by energizing one or the other of the three current sources 80–0, 80–1 and 80–2 which may be considered to apply inputs of ternary zero, ternary one and ternary two, respectively. These current sources, in accordance with the mode of operation of the circuit of FIG. 7, are operated at a time when the supply current source 32 is not operated. When, for example, current source 80–0 is energized, the gate of cryotron 40A, which is connected in path 30A, is driven resistive. Though it might appear at first glance that this would result in the quenching of the persistent current of three units of current flowing in the loop formed by paths 30A and 30D and leave unchanged the current circulating in the loops formed by paths 30B and 30D, and 30C and 30D, this is not the case. As pointed out above, the characteristic of the superconductive state which results in the storing of persistent currents is that the net flux threading a superconductive loop cannot be changed without introducing resistance into the loop. From an examination of the circuit of FIG. 7, it can be seen that the three units of current in the loop formed by paths 30A and 30D, since they flow in path 30D, produces flux which threads the loops formed by paths 30D and 30B and paths 30C and 30D. As a result, when current source 80–0 is energized to introduce resistance into path 30A, the net current in the loop formed by paths 30A and 30D is quenched but the net current in the other two loops is actually raised to maintain the flux constant in these loops. As a result of this operation, the net persistent currents flowing in the loops formed by paths 30B and 30D and paths 30D and 30C are raised to four units so that the total persistent current in path 30D is plus eight units and the total persistent current in each of the paths 30B and 30C is minus four units. There, is of course, then no net persistent current flowing in path 30A. With this condition having been obtained, the circuit may be interrogated by energizing a current source 82 to apply a pulse to three output cryotrons 42A, 42B and 42C which are connected in parallel across this source. Each of these output cryotrons requires more than three, but less than four units of current in its control conductor to drive its gate conductor resistive. The four units of current in paths 30A and 30B are, therefore, sufficient to maintain the gates of cryotrons 42A and 42B resistive and the current supplied by source 82 flows entirely in path 84–0 which includes the superconductive gate of cryotron 42A.

The operation of the circuit is the same when, after it has been conditioned by actuating sources 32 and 80–3 as above explained, input source 80–1 is energized. In such a case, a persistent current condition is realized which produces a total persistent current of plus eight units in path 30D and minus four units in each of the paths 30A and 30C. In such a case, the current supplied by source 82 is directed entirely through path 84–1. When, after the circuit is conditioned, current source 80–2 is energized to drive the gate of cryotron 40C resistive, the persistent current condition established is such that there is no current in path 30C, a current of plus eight units in path 30D and a current of minus four units in each of the paths 30A and 30B.

Particular note should be made of the fact that there is only one cryotron gate connected in each of the output paths 84–0, 84–1 and 84–2. Regardless of the one of the input sources 80–0, 80–1 or 80–2, which is energized, two of these gates are resistive and one is superconductive so the entire current from source 82 is directed through one of these paths. Further, when no input is applied after the circuit is conditioned, each of the paths 30A, 30B and 30C is carrying only three units of persistent current. The gates of cryotrons 42A, 42B and 42C are then superconductive and current supplied by source 82 divides equally between paths 84–0, 84–1 and 84–2, assuming they are of equal inductance. Each of these paths then carries only one third of the current from source 82 thereby providing an indication that no input has been applied to the circuit.

It will be apparent to those skilled in the art that devices constructed in accordance with the principles of the present invention may be constructed to store information values in any notation and that, regardless of the notation utilized, by proper design of the circuit, extremely good output discrimination is possible. Further, by properly choosing the number of parallel paths to be used in the circuit and/or using paths having properly related inductance values, the output discrimination for storage in any notation may be improved. Further, and this is an important consideration, devices constructed in accordance with the principles of the invention, provide current outputs, either continuously or intermittently, on a unique one of a number of output lines. Circuits may be constructed in accordance with these principles for applications other than storage. For example, the circuit of FIG. 7 may be used as a matrix switch to selectively apply coordinate address signals to a memory. When used in this application, the circuit is advantageous in that once the circuit has been conditioned, it is necessary to drive the gate of only one cryotron (40A, 40B or 40C) resistive to cause the current in the output circuit to be directed entirely to one of the three output paths. Further, once the input has been applied, it is not necessary that the current supplied by source 82 be maintained, but successive pulses may be applied by this source to the output circuit and each pulse is directed to the selected output line 84–0, 84–1 or 84–2 until the persistent current state of the circuit is changed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a superconductor circuit; at least first, second and third superconductive paths connected in parallel between first and second terminals to form at least first, second and third superconductive loops; current supply means connected to one of said terminals for applying current to said parallel superconductive paths and removing said applied current from said paths; means for selectively introducing resistance into one or more of said paths at a time when current is being applied by said current supply means and then allowing said paths to become superconductive before said applied current is removed; whereby, when said applied current is removed, persistent currents are established in two of said superconductive loops; and output means for said circuit responsive to the persistent currents stored in said loops.

2. In a superconductive circuit; a plurality of superconductive paths connected in parallel between first and second terminals to form a plurality of superconductive loops; current supply means connected to one of said terminals for applying current to said plurality of superconductive paths and removing said applied current from said paths; means for selectively introducing resistance into one or more of said paths at a time when current is being applied by said current supply means and then allowing said paths to become superconductive before said applied current is removed; whereby, when said applied current is removed, persistent currents are established in more than one of said superconductive loops; and output means for said circuit responsive to the persistent currents stored in said loops.

3. The circuit of claim 2 wherein said circuit includes at least three parallel superconductive paths forming at least three superconductive loops.

4. The circuit of claim 2 wherein said circuit includes at least four superconductive parallel paths forming at least six superconductive loops.

5. The circuit of claim 2 wherein each of said superconductive paths in said plurality has essentially the same inductance.

6. The circuit of claim 2 wherein one of said superconductive paths in said plurality has a lower inductance than another one of said paths in said plurality.

7. The circuit of claim 2 wherein said circuit includes means for introducing resistance into said one of said paths after said applied current is removed and said persistent currents are established; whereby, said persistent current in one of said loops is decreased and the persistent current in another one of said loops is increased.

8. In a superconductive circuit; first, second and third superconductive current paths connected in parallel circuit relationship; said first and second paths forming a first superconductive loop; said first and third paths forming a second superconductive loop; said second and third paths forming a third superconductive loop; input means for said circuit for causing said circuit to selectively assume either a first stable state with persistent current stored in said first and second superconductive loops or a second stable state with persistent current stored in said second and third superconductive loops; and output means for said circuit including at least one superconductive gating device responsive to persistent current in said first superconductive path to indicate the stable state of said circuit.

9. The circuit of claim 8 wherein said output means includes a second superconductive gating device responsive to persistent current flow in said third path; said first and second superconductive gating devices being connected in parallel circuit relationship in said output circuit; said first gating device being resistive and said second gating device being superconductive when said circuit is in said first stable state and said first gating device being superconductive and said second gating device being resistive when said circuit is in said second stable state.

10. The circuit of claim 8 wherein the inductance of said second superconductive path is less than the inductance of each of said first and third superconductive paths.

11. In a superconductor circuit; a plurality of superconductive paths connected in parallel circuit relationship to form a plurality of superconductive loops; means for selectively causing said circuit to assume different persistent current states in each of which a persistent current is stored in at least two of said plurality of superconductive loops and in at least one of which the total persistent current flowing in one of said parallel superconductive paths is greater than the total persistent current flowing in another one of said parallel superconductive paths; and output means responsive to current in said circuit.

12. In a superconductor circuit; a plurality of superconductive paths connected in parallel circuit relationship; each of said superconductive paths forming with each other of said superconductive paths a closed superconductive loop; input means for causing said circuit to assume a persistent current state in which a persistent current is stored in two of said superconductive loops each of which includes, as part thereof, a particular one of said superconductive paths; whereby the total persistent current flowing in said particular superconductive path is greater than the total persistent current flowing in the other of said superconductive paths forming therewith the two superconductive loops in which persistent current is stored; and output means responsive to current in said circuit.

13. In a superconductor circuit; first, second and third superconductive paths connected in parallel circuit relationship to form first, second and third superconductive loops; means for causing said circuit to assume a persistent current state in which persistent current flows in said first and third paths and the persistent current flowing in said first path is greater than the persistent current in said third path; and output means responsive to current in said circuit.

14. A superconductor bistable circuit including first, second and third superconductive current paths connected in parallel circuit relationship; said first and second paths forming a first superconductive loop; said second and third paths forming a second superconductive loop; said second and third paths forming a third superconductive loop; current supply means connected to said paths for applying current thereto and removing said applied current therefrom; first input means for causing said circuit to assume a first stable state with persistent current stored in said second and third superconductive loops; said first input means being effective when actuated to introduce resistance into said first and second current paths; second input means for causing said circuit to assume a second stable state with persistent current stored in said first and second superconductive loops; said second input means being effective when energized to introduce resistance into said second and third superconductive paths; and first and second superconductor output gate conductors for said circuit responsive to current flow in said first and third paths, respectively.

15. The circuit of claim 14 wherein said second superconductive path has an inductance less than that of each of said first and third superconductive paths.

16. The circuit of claim 14 wherein said circuit also includes a fourth superconductive path connected in parallel with said first, second and third superconductive paths and forming with each a superconductive loop, and each of said first and second input means is effective when energized to introduce resistance into said fourth superconductive path.

17. A superconductor ternary storage circuit including; first, second and third superconductive current paths connected in parallel circuit relationship; said first and second paths forming a first superconductive loop; said first and third paths forming a second superconductive loop; said second and third paths forming a third superconductive loop; current supply means connected to said paths for applying current thereto and removing the applied current therefrom; first input means for causing said circuit to assume a first stable persistent current state and effective when actuated to introduce resistance into said first and second current paths; second input means for causing said circuit to assume a second stable persistent current state and effective when energized to introduce resistance into said second and third superconductive paths; third input means for causing said circuit to assume a third stable persistent current state and effective when energized to introduce resistance into said first and third superconductive paths; and output means for said circuit including at least first, second and third output gate conductors responsive to current in said first, second and third paths, respectively.

18. The circuit of claim 17 wherein said circuit also includes a fourth superconductive path connected in parallel circuit relationship with said first, second and third superconductive paths and forming with each of said first, second and third paths a superconductive loop; each of said input means being effective when energized to introduce resistance into said fourth superconductive path.

19. A superconductor circuit comprising; a plurality of superconductive paths connected in parallel circuit relationship and forming a plurality of superconductive loops; current supply means for applying current to said parallel connected superconductive paths and removing current therefrom; input means for selectively introducing resistance into said paths at a time when current is applied by said current supply means and then allowing said paths to become superconductive before the applied current is removed; whereby persistent currents are selectively established in different ones of said superconductive loops; and output means for said circuit responsive to current in said superconductive paths.

20. In a superconductor circuit; a plurality of superconductive paths connected in parallel circuit relationship to form a plurality of superconductive loops; means for causing said circuit to assume a persistent current condition in which persistent currents are stored in at least two of said plurality of superconductive loops and for thereafter introducing resistance into at least one of said paths in which persistent current is flowing to quench the persistent current flowing in that path and at the same time increase the persistent current flowing in at least one other of said paths in said circuit.

21. In a superconductor circuit; a plurality of superconductive paths connected in parallel circuit relationship forming a plurality of superconductive loops; a first and second one of said paths forming a first one of said superconductive loops; said first and a third one of said paths forming a second one of said superconductive loops; control means for causing said circuit to assume a persistent current state in which persistent currents are stored in said first and second superconductive loops and for thereafter introducing resistance into said second path; whereby the persistent current in said second path is quenched, the persistent current in said first path is decreased and the persistent current in said third path is increased; and output means responsive to current in said circuit.

22. The circuit of claim 21 wherein said control means includes current supply means for applying current to said parallel superconductive paths and removing said applied current from said paths and means for introducing resistance into said superconductive paths both when current is applied by said current supply means and after said applied current is removed.

23. In a superconductor circuit; first, second and third superconductive paths connected in parallel circuit relationship to form first, second and third superconductive loops; means for causing said circuit to assume a persistent current condition in which a persistent current flows in said first and third superconductive paths, and for thereafter introducing resistance into said first path to cause the persistent current in said second path to be increased; and output means responsive to current in said circuit.

24. The method of changing the persistent current stored in a first superconductive loop formed by first and second super-conductive paths connected in parallel circuit relationship comprising the steps of: first storing a persistent current in a second super-conductive loop formed by said first superconductive path and a third superconductive path connected in parallel circuit relationship with said first and second superconductive paths; whereby at least a portion of the flux produced by said persistent current in said second super-conductive loop links said first superconductive loop; and then introducing resistance into said third path while maintaining said first superconductive loop completely superconductive.

References Cited in the file of this patent

"Persistent Current Ring Counter," by J. L. Anderson et al., I.B.M. Technical Disclosure Bulletin, vol. 2, No. 2, August 1959, pp. 53 and 54.

UNITED STATES PATENT OFFICE

CERTIFICATE OF CORRECTION

Patent No. 3,093,816 June 11, 1963

Lloyd P. Hunter

It is hereby certified that error appears in the above numbered patent requiring correction and that the said Letters Patent should read as corrected below.

Column 1, line 63, for "when" read -- where --; column 12, line 67, for "conterclockwise" read -- counterclockwise --; column 15, line 39, for "superconductive" read -- superconductor --; column 16, line 29, for "second and" read -- first and --.

Signed and sealed this 31st day of March 1964.

;EAL)
.ttest:
;RNEST W. SWIDER ttesting Officer

EDWARD J. BRENNER

Commissioner of Patents